June 12, 1951
N. F. THOMPSON
2,556,713
ELECTRONIC CONTROL CIRCUIT
Filed May 16, 1946
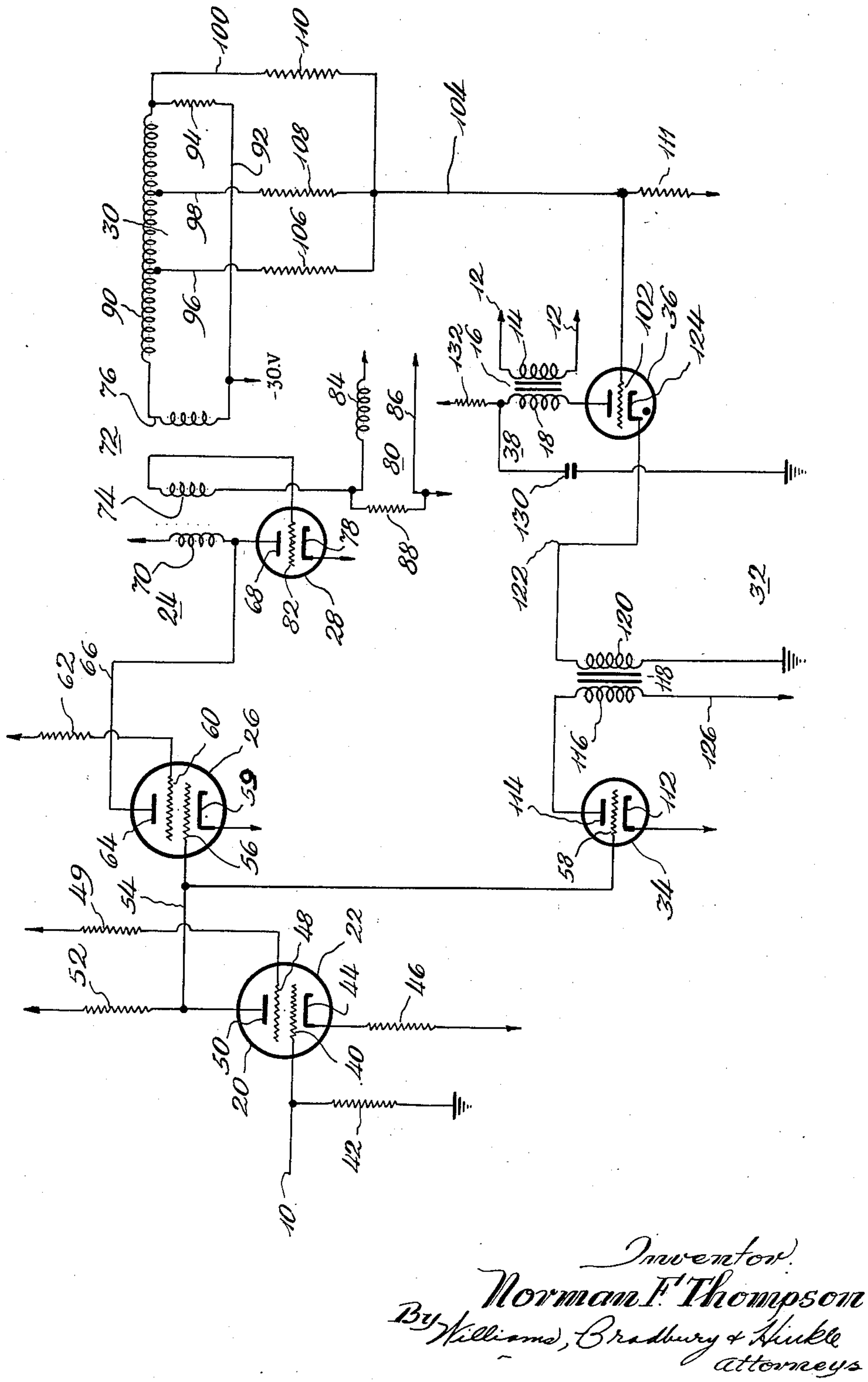
Inventor:
Norman F. Thompson
By Williams, Bradbury & Hinkle
Attorneys Patented June 12, 1951 2,556,713

UNITED STATES PATENT OFFICE 2,556,713

ELECTRONIC CONTROL CIRCUIT

Norman F. Thompson, Akron, Ohio, assignor to Stewart-Warner Corporation, Chicago, Ill., a corporation of Virginia Application May 16, 1946, Serial No. 670,068

5 Claims. (Cl. 250—27)

The present invention relates to an electronic control circuit and more particularly to a control circuit of the type effective to produce an output pulse only in the event an electronic control device included in the circuit is supplied with coincident control pulses.

A primary object of the present invention is to provide a new and improved electronic control circuit including a gas tube for producing an output pulse when the tube is supplied with coincident control pulses.

A further object of the present invention is to provide a new and improved control circuit of the character described including but one gas tube for providing an output pulse when the tube is supplied with coincident control pulses at any one of a plurality of selected time intervals after an initial pulse.

Other objects and advantages of the present invention will become apparent from the ensuing description of an embodiment of the invention in the course of which reference is had to the accompanying drawing, the single figure of which is a schematic representation of the invention.

The apparatus of the present invention may be utilized in the control of various types of apparatus. As an example, it may be used for controlling identification equipment in airplanes or other vehicles wherein the equipment is automatically placed in operation when supplied with a pulse. This pulse is supplied only when the equipment on the airplane is supplied with pairs of control pulses, one of which occurs a predetermined time interval after the first. The apparatus illustrated in the drawing is a part of the equipment installed on the airplane. The input pulses are supplied to a conductor 10 at preselected time intervals. For example, the second pulse of each pair may occur either 3, 5 or 8 microseconds after the first pulse. These pairs of pulses are repeated at desired time intervals preferably exceeding 8 microseconds. The output pulse is supplied to the apparatus to be controlled through an output line 12 connected to the secondary winding 14 of the output transformer 16 having a primary winding 18.

The apparatus of the present invention is so constructed and arranged that an output pulse occurs only in the event the time interval between the pulses of each pair of pulses corresponds to a predetermined value, as of the 3, 5 or 8 microseconds heretofore mentioned. The control circuit includes, in the main, an amplifier section 20 including an amplifier tube 22 (which may be of the 6AG5 type); a branch circuit 24 for producing control pulses occurring at the preselected time intervals and comprising a trigger tube 26 (which may be of the 6AG5 type), a blocking oscillator type pulse-former including tube 28 (which may be of the 6C4 type), and a delay line 30; a second branch circuit 32 including an amplifier tube 34 (which may be of the 6C4 type) and a gas tube 36 (which may be of the 884 type) supplied with nondelayed and the delayed pulses and rendered conductive only when supplied with coincident pulses; and output pulses producing means 38 for producing an output pulse when the tube is supplied with coincident pulses.

The pairs of input pulses are supplied by conductor 10 to the control grid 40 of tube 20, which is connected to ground by grid resistor 42 (of about 50,000 ohms). The pulses supplied to the grid are preferably negative square wave type pulses. The tube has its cathode 44 connected to a suitable negative low voltage source, as of about thirty volts, through cathode resistor 46 (of about 3,000 ohms). The screen grid 48 of the tube is connected to a suitable source of positive voltage, as of about 120 volts, through resistor 49 (of about 22,000 ohms), and the anode 50 is connected to a source of anode potential through resistor 52 (of about 33,000 ohms).

The amplified input pulses, which are also inverted by the amplifier tube, are supplied to the control grids of the trigger and amplifier tubes 26 and 34 in branch circuits 24 and 32 through a conductor 54 leading to the control grid 56 of tube 26 and to the control grid 58 of tube 34.

The initial pulse is transmitted by the trigger tube as a negative pulse to the blocking oscillator and a single positive pulse is supplied to the delay line 30. The trigger tube 26 includes also a cathode 59, which may be connected to a source of positive potential, as of about 120 volts, a screen grid 60, which is connected to a suitable source of voltage, as of about 300 volts, through resistor 62 (of about 22,000 ohms), and an anode 64 coupled by conductor 66 to the anode 68 of the blocking oscillator. The anode 68 of tube 28 and anode 64 of tube 26 are connected to a suitable source of positive anode potential, as of about 300 volts, through the primary winding 70 of a transformer 72 including also a feedback coil 74 and a secondary output winding 76 connected to the delay circuit. The tube 28 includes also a cathode 78 connected to the positive terminal of a suitable source of potential, as of about 120 volts.

The blocking oscillator is rendered ineffective for a predetermined time interval after the occurrence of the first of two control pulses by a delay line 80 coupled to the control grid 82 of the oscillator tube through the feedback coil 74. The delay line includes an inductance coil 84 and a conductor 86, which are connected through a resistor 88 of about 2000 ohms. The conductor 86 is connected to a suitable source of negative potential, as of about 30 volts.

The pulse delay line 30 includes a tapped inductance coil 90, a conductor 92, and resistor 94 of values such that the pulse appears at the tap conductors 96, 98 and 100 at the preselected time intervals, in this case at intervals of 3, 5 or 8 microseconds after the occurrence of the initial input pulse. These delayed pulses are supplied to the control grid 102 of the gas tube 36 through a conductor 104 common to all three taps and individual current limiting resistors 106, 108 and 110 of about 10,000 ohms in each of the tap connections. The grid is also connected to a suitable source of negative bias voltage, as of about 30 volts, through resistor 111 (of about 100,000 ohms).

The amplified pulses supplied to the second branch circuit 32 are supplied as negative pulses to the cathode of the tube 36 and the second pulse of each pair is effective to render the tube conductive, because the time interval between the pair of input pulses corresponds to the delay imposed upon the initial pulse in the time delay circuit 30.

The amplified pulses are supplied to the grid 58 of the amplifier tube 34 through the previously referred to conductor 54. The tube 34 includes also a cathode 112 and an anode 114, the latter having connected to it the primary windings 116 of a coupling transformer 118 including also a secondary winding 120 connected by a conductor 122 to the cathode 124 of the gas tube 36. Suitable anode potential, as of about 300 volts, for tube 34 is supplied by conductor 126. The cathode 112 is connected to a source of positive voltage of about 120 volts.

When the gas tube 36 is rendered conductive by the application of coincident pulses to its grid and cathode, a pulse of current is caused to flow through the primary winding 18 of the output transformer 16. This pulse is supplied by a capacitor 130, as of about 10 mmf., connected across the primary winding and tube. The capacitor is normally charged by a resistor 132 (of about 470,000 ohms) connected to a suitable source of voltage, as of about 300 volts.

In operation, pairs of input control pulses are supplied from a suitable source to the control grid of the first amplifier tube 20. These control pulses are amplified and supplied to the control grids of the tubes 26 and 34 to the time delay producing and nondelay circuits 24 and 32, respectively. The first pulse has no effect on the latter circuit, or more specifically, does not render tube 36 conductive because at the time that it is applied to the cathode as a negative pulse, no positive pulse is applied to the control grid 102. However, the blocking oscillator is set into operation and a positive pulse is supplied to the time delay circuit 30 with the result that a series of pulses are applied to the grid 102 of the gas tube at the predetermined selected time interval or 3, 5 or 8 microseconds. Then, upon the occurrence of the second pulse the gas tube 36 is rendered conductive by the coincident application of a positive pulse upon the grid and a negative pulse upon the cathode. When the tube is rendered conductive the capacitor 130 is discharged through the primary winding of the output transformer with a result that an output pulse is induced in the secondary winding 14 supplied to the control device through the output circuit 12.

While but a single embodiment of the invention has been illustrated and described in detail it should be understood that various modifications may be made therein and that the details are not to be considered as limitative except in so far as set forth in the accompanying claims.

Having thus described my invention, what I claim as new and desire to secure by Letters Patent is:

1. An electronic control circuit for producing an output pulse in response to a pair of control pulses transmitted over the same channel, the second of which occurs at a selected predetermined time interval after the first, including in combination, means supplied with and controlled in response to the first of said pair of pulses for producing a series of delayed pulses at spaced time intervals, one of which corresponds to the time between said pair of pulses, means supplied with and controlled in response to said pairs of pulses for producing undelayed pulses occurring at times corresponding to said pair of pulses, and means including a gas tube coupled to said two first mentioned means and controlled by said nondelayed and delayed pulses for producing a single output pulse.

2. An electronic control circuit for producing an output pulse in response to a pair of control pulses transmitted over the same channel, the second of which occurs at a selected predetermined time interval after the first, including in combination, means including a time delay circuit supplied with and controlled in response to the first of said pulses for producing a series of delayed pulses at spaced time intervals, one of which corresponds to the time between said pair of pulses, means supplied with and controlled in response to said pairs of pulses for producing undelayed pulses occurring at times corresponding to said pair of pulses, and means including a normally nonconductive gas tube having at least a pair of electrodes and connections from said electrodes to said time delay circuit and said last mentioned means for producing a single output pulse.

3. An electronic control circuit for producing an output pulse in response to a pair of control pulses transmitted over the same channel, the second of which occurs at a predetermined time interval after the first, including in combination, means supplied with and controlled in response to the first of said pulses for producing a delayed pulse after a time corresponding to the time between said pair of pulses, means supplied with and controlled in response to said pairs of pulses for producing an undelayed control pulse coinciding with said delayed pulse, and means including a gas tube coupled to said two first mentioned means and controlled by said coincident pulses for producing a single output pulse.

4. An electronic control circuit for producing an output pulse in response to a pair of control pulses, the second of which occurs at a selected predetermined time interval after the first, means including amplifying means supplied with said control pulses, a pulse-former connected to said amplifying means and a time delay circuit connected to said pulse-former for producing a series of delayed pulses at spaced time intervals, one of which corresponds to the time between said pair of pulses, means including amplifying means and a transformer for producing undelayed pulses occurring at times corresponding to each of said pair of pulses, a gas tube having a grid connected to said time delay circuit and a cathode connected to said transformer whereby said gas tube is rendered conductive upon the application of coincident pulses to said grid and cathode, and means for producing a single output pulse when the gas tube is rendered conductive, said last mentioned means including a transformer having a primary winding connected to said gas tube and a normally charged capacitor adapted to discharge through said winding and gas tube.

5. An electronic control circuit for producing a single output pulse in response to a pair of control pulses transmitted over a single channel and spaced apart by a predetermined time interval, including in combination, means supplied with and controlled in response to the first of said pair of pulses for producing a series of delayed pulses at spaced time intervals, one interval of which corresponds to said predetermined time interval, means including a normally nonconductive tube adapted to be rendered conductive for producing a single output pulse, and means for rendering said tube conductive at the time of the second pulse of said pair of pulses including means supplying said tube with said delayed pulses and means for supplying said tube with said pair of control pulses without delay.

NORMAN F. THOMPSON.

REFERENCES CITED

The following references are of record in the file of this patent:

UNITED STATES PATENTS

| Number | Name | Date |
|---|---|---|
| 2,089,639 | Bedford | Aug. 10, 1937 |
| 2,199,634 | Koch | May 7, 1940 |
| 2,217,957 | Lewis | Oct. 15, 1940 |
| 2,236,134 | Gloess | Mar. 25, 1941 |
| 2,277,000 | Bingley | Mar. 17 1942 |
| 2,403,600 | Holmes et al. | July 9, 1946 |
| 2,412,994 | Lehmann | Dec. 24, 1946 |
| 2,415,093 | Gerwin | Feb. 4, 1947 |
| 2,415,359 | Loughlin | Feb. 4, 1947 |
| 2,415,855 | Skellett | Feb. 18, 1947 |
| 2,449,819 | Purington | Sept. 21, 1948 |

FOREIGN PATENTS

| Number | Country | Date |
|---|---|---|
| 528,192 | Great Britain | Oct. 24, 1940 |